US007177822B2

(12) United States Patent  
Mahmood et al.

(10) Patent No.: US 7,177,822 B2
(45) Date of Patent: Feb. 13, 2007

(54) COMMON DATABASE SYSTEM FOR SALES AND MARKETING PROCESS

(75) Inventors: Syed Ashfaq Mahmood, Southfield, MI (US); Susan I Stallard, West Bloomfield, MI (US); Richard W Everett, Pinckney, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 1064 days.

(21) Appl. No.: 09/923,646

(22) Filed: Aug. 7, 2001

(65) Prior Publication Data

US 2002/0022987 A1 Feb. 21, 2002

Related U.S. Application Data

(60) Provisional application No. 60/223,801, filed on Aug. 8, 2000.

(51) Int. Cl.
*G06F 17/30* (2006.01)
(52) U.S. Cl. .......................................... 705/10
(58) Field of Classification Search .................. 705/10
See application file for complete search history.

(56) References Cited

U.S. PATENT DOCUMENTS 5,625,816 A * 4/1997 Burdick et al. ............... 705/10

5,966,695 A * 10/1999 Melchione et al. ............ 705/10
6,925,441 B1 * 8/2005 Jones et al. .................. 705/10

FOREIGN PATENT DOCUMENTS

WO WO 9750240 A1 * 12/1997

OTHER PUBLICATIONS

"Lloyds Attempts to Produce Central Database of Customers", Jul. 1987, Beverage World, Dialog file 583, Accession No. 01238395.*
Katherine "Database marketing: Leaves marketing to the branches", Nov. 1994, Bank Marketing v26n11 pp. 22-30, Dialog file 15, Accession No. 00933684.*

* cited by examiner

Primary Examiner—Romain Jeanty
(74) Attorney, Agent, or Firm—Ralph E. Smith

(57) ABSTRACT

A marketing system with a centralized database for compiling and distributing marketing data. The system compiles marketing data from a plurality of internal and external data sources into a centralized database. Internal and external sources include legacy systems. Data in the centralized database is distributed to a plurality of client venues by using an extract engine to extract a subset of data from the centralized database and creating a venue specific database. Access to the venue specific database is facilitated by use of a application programmers interface for allowing the development of applications for venue specific use of the venue specific database. Both the compilation and distribution process is performed on a periodic basis to provide timely, accurate, and consistent marketing data across the plurality of client venues.

15 Claims, 5 Drawing Sheets

COMMON DATABASE SYSTEM FOR SALES AND MARKETING PROCESS

CROSS-REFERENCE TO RELATED APPLICATIONS

This application claims priority upon U.S. Provisional Patent Application Ser. No. 60/223,801 filed on Aug. 8, 2000, the disclosure of which is incorporated herein by reference.

FIELD OF THE INVENTION

The present invention relates generally to a business system for providing a common database for marketing and sales and, more particularly, to a marketing system with a centralized database for extracting sales and marketing information for specific processes and applications.

BACKGROUND OF THE INVENTION

Organizations that market their products or services frequently compile vast collections of data pertaining to the products or services that are used in marketing and sales. This data may come from several sources including internal marketing departments and external agencies such as advertising agencies or governmental agencies. This data is distributed to clients and consumers in order to provide an accurate, consistent message about products and services offered. When several different systems, including the organization's legacy systems, are utilized to store this data there is a high probability of developing redundancy in the data stored and as a result providing inaccurate information regarding the products or services or sending inconsistent messages about products or services.

Therefore, a challenge for any organization, and specifically a large organization is the maintenance and control of all marketing related data pertaining to products or services offered by the organization. The challenge is compounded when the organization has multiple legacy systems used to store different components of the marketing information. Issues of security, redundancy, and consistency make marketing data centralization and management of critical importance in order to reach the target audience with an accurate and appropriate marketing message.

Therefore, a system is needed that will allow for management, maintenance and distribution of marketing data. A system is required that will provide a single "point of truth" for all marketing data while at the same time providing venue specific marketing data to venue specific applications. In addition, a system is needed that will converge data from several sources including sources external to the organization and including the organizations legacy systems.

SUMMARY OF THE INVENTION

The present invention provides a solution to the above described problems. The invention is directed to a marketing system with a centralized marketing database. This system compiles marketing data from a plurality of internal and external sources into a centralized database. Internal and external sources include legacy systems that do not directly interact with each other or the centralized database. Data from these internal and external data sources, including the legacy system, is compiled on a periodic basis into the centralized database. The frequency of compilation depends upon the frequency of change for the data involved. For example, data regarding a particular product's pricing may change weekly and therefore data from an internal legacy system pertaining to pricing for that product would be compiled into the centralized database on a weekly basis. Other data, including external zip code information for example, may be compiled on a yearly basis as this data changes infrequently.

After the data is compiled pursuant to its specific compilation schedule into the centralized database, it can then be made available to any client, customer, entity or employee of the organization who can then work with the data. In order to allow access to the centralized database from disparate systems, an extract engine is used to compile specific elements of the centralized database into separate venue specific databases to be used by venue specific clients. The venue specific databases are then distributed to clients for use until another version of the venue specific databases are created.

The invention allows the client access to the venue specific data through an application programming interface (API) for programming their specific interface to the data. The API allows the client to customize their access to the data and to utilize the data on an ad hoc basis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
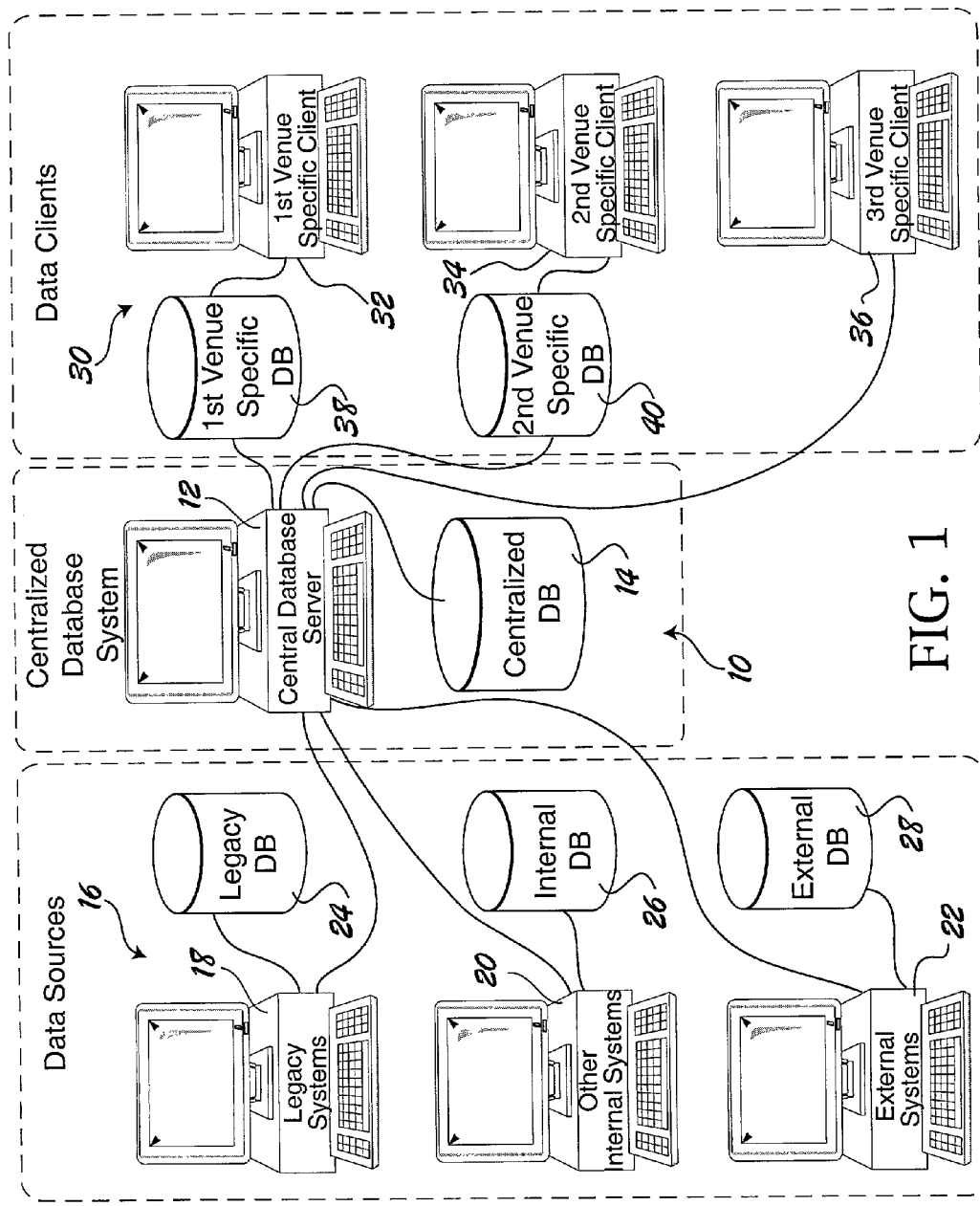
FIG. 1 is a block diagram illustrating the centralized marketing database system of the invention with data flowing from internal and external sources into a centralized database for distribution to data clients.

In FIG. 1, a centralized database system 10 incorporating a central database server 12 with a centralized database 14 attached in accordance with the preferred embodiment of the present invention is shown. Data sources 16 that provide data to the centralized database system 10 include legacy systems 18, other internal systems 20, and external systems 22. Legacy systems 18 include applications in which the organization has already invested considerable time and money. These legacy systems typically do not directly communicate with other database management systems. Other internal systems 20 includes all other systems internal to the organization. External systems 22 includes systems external to the organization. For example, external systems includes systems at marketing firms or governmental agencies.

Each of the data sources 16 has a database attached. Legacy systems 18 include a legacy databases 24, other internal systems 20 include internal databases 26, and external systems 22 include external databases 28.

The centralized database system 10 has attached a plurality of data clients 30. To illustrate this, a first venue specific client 32, a second venue specific client 34 and a third venue specific client 36 are shown. First and second venue specific clients 32, 34 have a first and second venue specific database 38, 40 attached. Third venue specific client 36 interfaces with the centralized database 14 through the centralized database server 12.

It will be appreciated that while the centralized database system 10, data sources 16 and data clients 30 are illustrated as personal-computers, that the invention can be used with virtually any size and type of computing system including personal-computers, mini-computers, mainframes, and combinations thereof and therefore should not be construed as being limited to use with only personal-computers.

Figure 2:
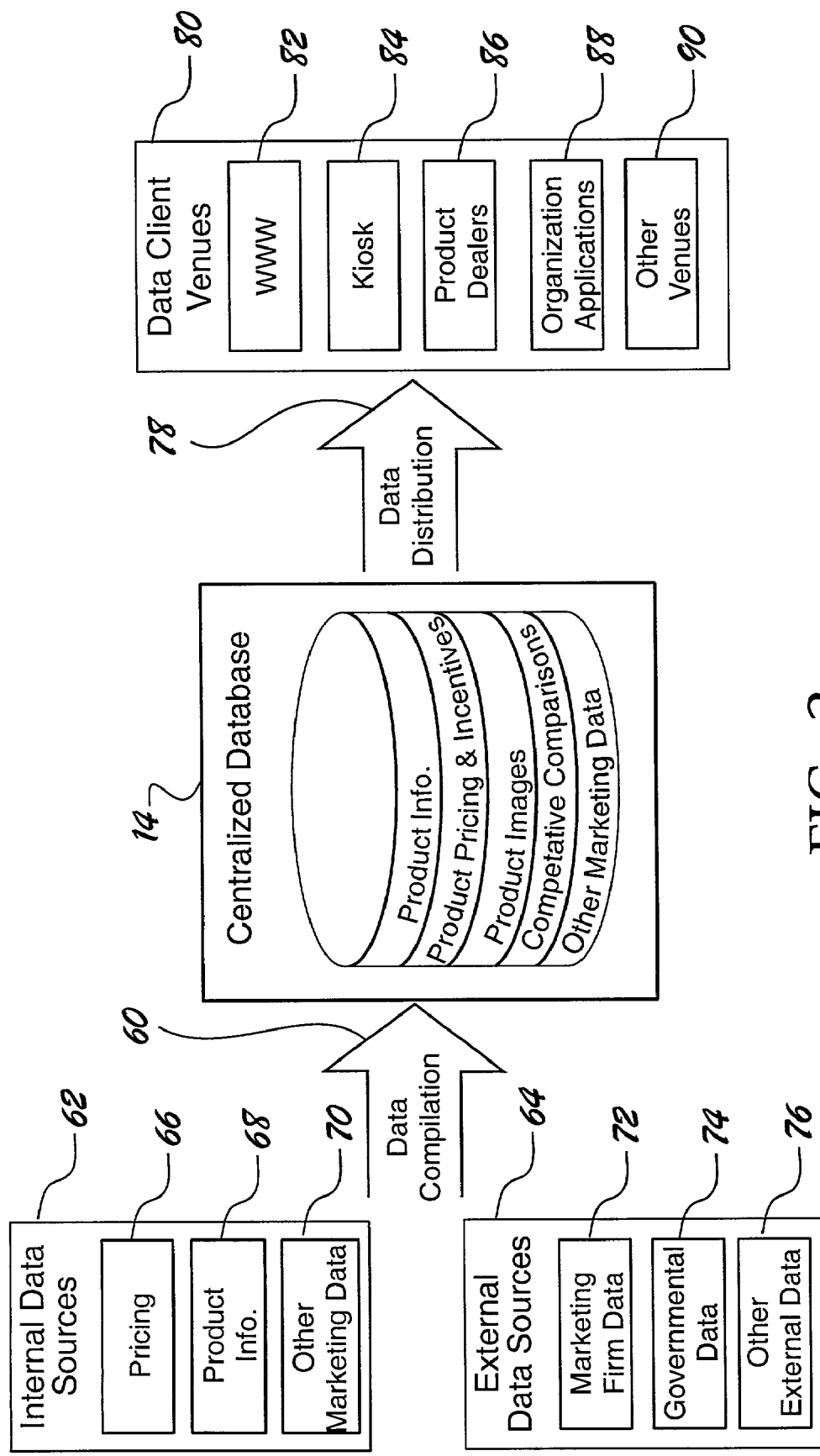
FIG. 2 is a block diagram illustrating the centralized marketing database system of FIG. 1 showing a plurality of sources for marketing data and plurality of data client venues.

Referring to FIG. 2, the centralized database 14 of the centralized database system 10 is a data compilation 60 created from internal data sources 62 and external data sources 64. Internal data sources 62 includes data from legacy systems 18, and other internal systems 20 along with their associated databases 24, 26. External data sources 64 includes data from external systems 22 with their associated databases 28. The data in internal data sources 62 include pricing information 66, product information 68 and other marketing data 70. Other marketing data 70 represents a plurality of data sources providing marketing data information for the products/services offered by an organization. For example, other marketing data may include information about customer preferences including information determined as a result of research. Other marketing data 70 may also include any other data used in the marketing effort, including multi-media data comprising sound and image data for a particular product or service.

The data compilation 60 also includes external data sources 64. External data sources 64 comprise a plurality of data sources including marketing firm data 72, governmental data 74 and other external data 76.

The internal data sources 62 and external data sources 64 are integrated into the centralized database 14. The compilation of data within the centralized database 14 is then distributed through a data distribution 78 process to data client venues 80. Data client venues include the worldwide web 82, kiosks 84, product dealers 86, organization applications 88, and other venues 90.

Figure 3:
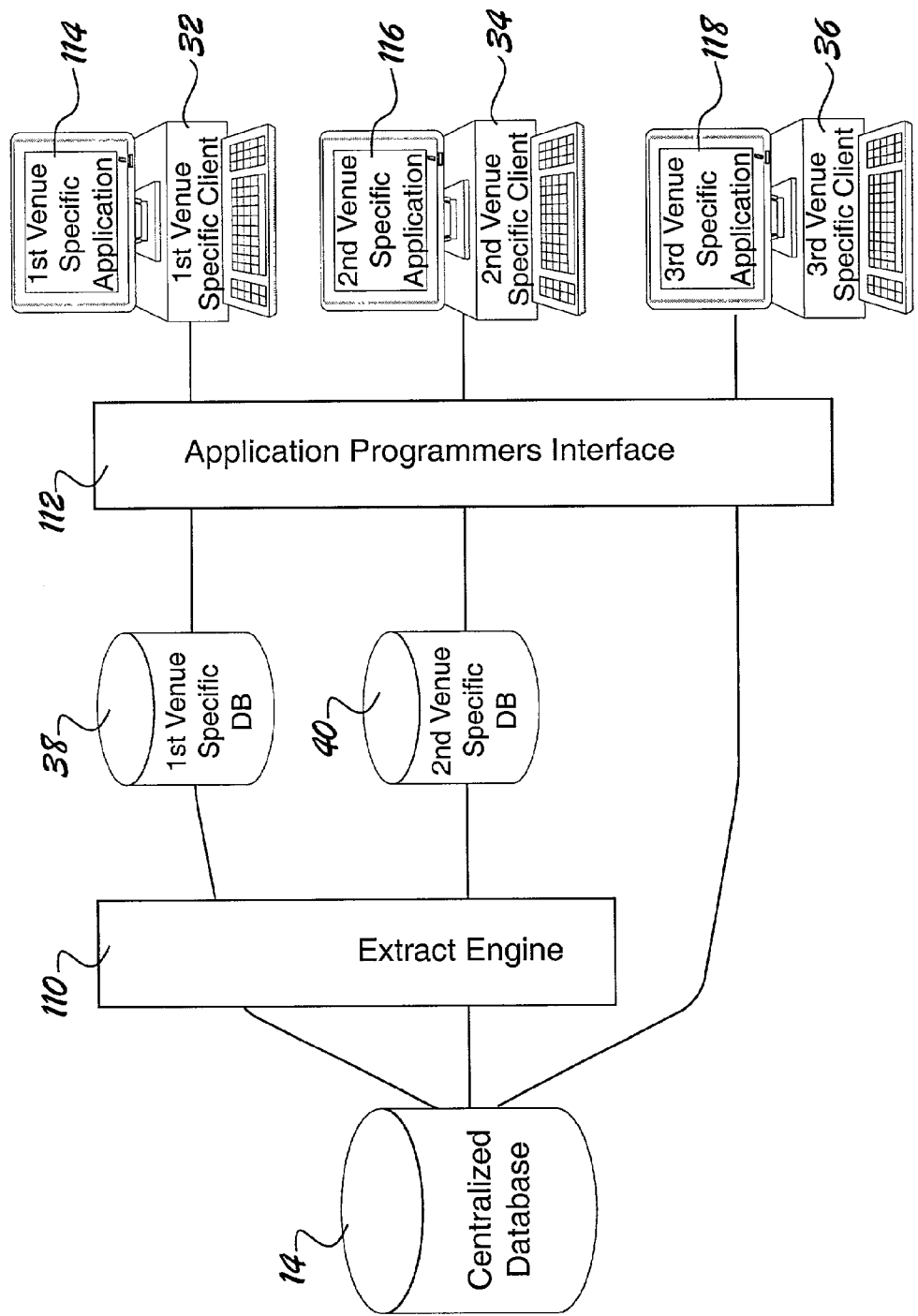
FIG. 3 is a block diagram illustrating the centralized marketing database system of FIG. 1 showing the extraction of data and application of an applications programmer interface (API)

Now referring to FIG. 3, first, second and third venue specific clients 32, 34, 36 are allowed access to different subsets of data within the centralized database 14. An extract engine 110 extracts venue specific data from the centralized database 14 to create a first venue specific database 38 and a second venue specific database 40. The first venue specific client 32 and second venue specific client 34 access their respective databases through an application programmers interface (API) 112. An API is set of source code and/or object code modules that aid a programmer in developing a software application for accessing data from a venue specific database 38, 40 or the centralized database 14. The first venue specific client 32, second venue specific client 34 and third venue specific client 36 have a first venue specific application 114, second venue specific application 116 and a third venue specific application 118 respectively, as developed with the API.

The other possibility of accessing data directly from the centralized database 14 is illustrated by the third venue specific client 36 connecting directly to the centralized database 14 through third venue specific application 118 using the application programmers interface 112.

Figure 4:
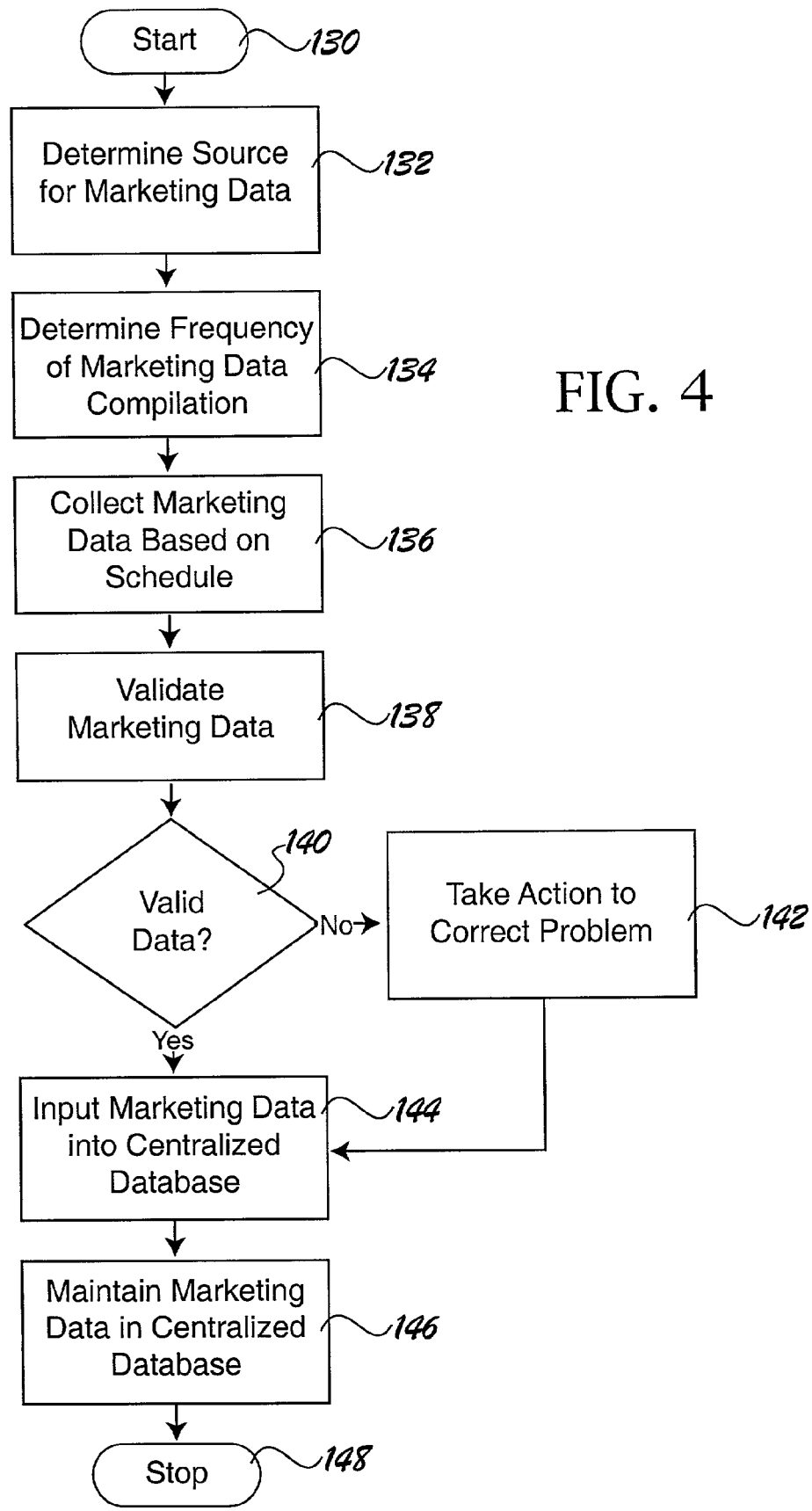
FIG. 4 is a flowchart illustrating the process of compilation of data into the centralized database.

Referring to FIG. 4, the centralized marketing database system process starts in step 130. In step 132, a source for the marketing data is determined. This involves identifying all sources for marketing data that should be compiled into the centralized database 14. Data sources 16 include legacy systems 18, other internal systems 20 and external systems 22. Next in step 134, a determination is made as to how frequently the marketing data should be collected from the various data sources 16. The frequency will vary depending on the type of data. For example, pricing data 66 may change on a daily or weekly basis. Therefore, pricing data 66 may require compilation 60 into the centralized database 14 on a daily or weekly basis. Other data, for example, governmental data 74 may change on an infrequent basis such as yearly. Therefore, this type of data can be compiled 60 into the centralized database 14 on a yearly basis.

Next in step 136, the marketing data is compiled 60 into the centralized database 14 based upon the predetermined schedule. In step 138, the marking data is validated before it is accessed by data clients 30. Several approaches to data validation will be utilized. This includes testing the data for accuracy by comparing it to other data sources and to similar prior data. In step 140, a check is made to determine if the data is valid. If the data is not valid, then in step 142, action is taken to correct the problem. Corrective action involves re-requesting the data or retrieving the same data from another source. After the data is validating, then in step 144, it is input into the centralized database 14. In step 146 the marking data is maintained in the centralized database 14. The process ends in step 148.

Figure 5:
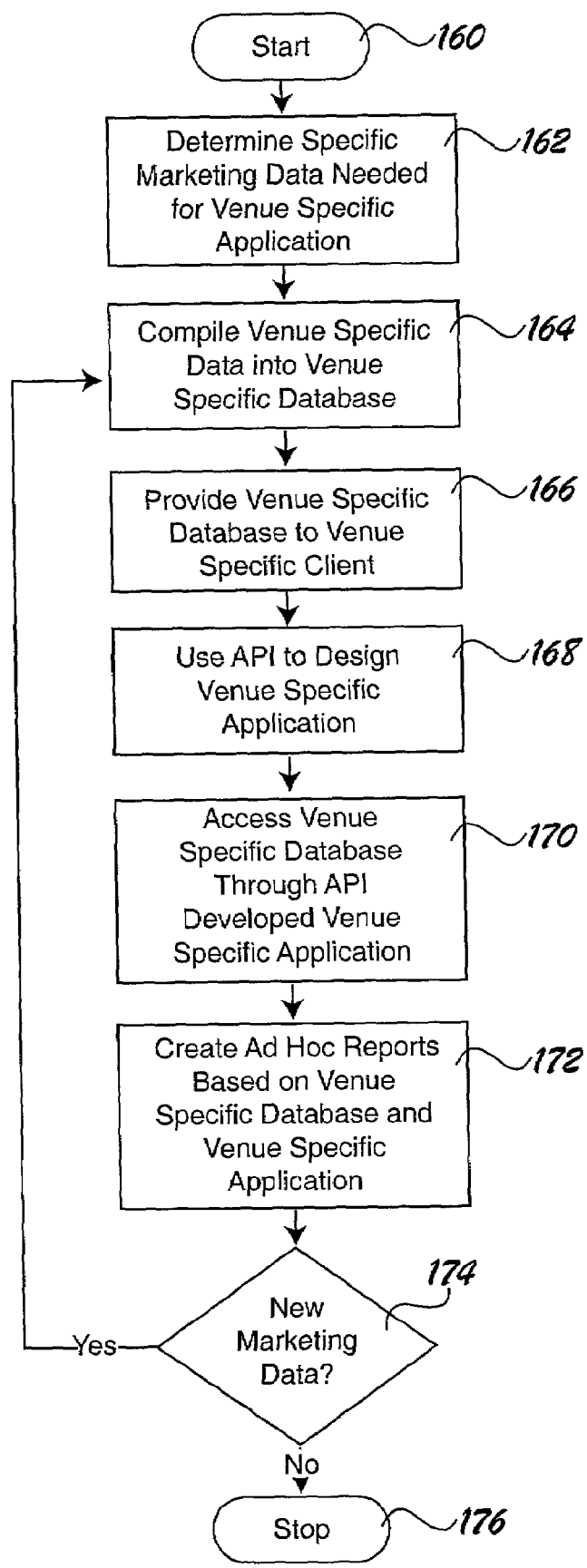
FIG. 5 is a flowchart illustrating the process of distributing the data to data client venues.

Now referring to FIG. 5, the centralized marketing database system process of providing venue specific data to data clients 80 starts in step 160. In step 162 a determination is made as to what specific marketing data is required for the venue specific application. Different data client venues 80 may require different data.

Next in step 164 venue specific data is retrieved from the centralized database 14 and used to create a venue specific database such as a first venue specific database 38. In step 166, the venue specific database is provided to one of the data clients 30, such as a first venue specific client 32. In step 168, the application programmers interface 112 is used by the venue specific client to create a venue specific application. In other words, the venue specific client is able to use the API to create a program specifically designed to extract and use data contained within the venue specific database.

In step 170, the venue specific database, such as a first venue specific database 38, is accessed through the API 112 developed application. In step 172, the venue specific client uses the application developed through the API to create ad hoc reports based on the venue specific database. Next, in step 174 the possible addition of new marketing data is considered. If data is added, then the process logic moves back to step 164 where the data is again compiled into a venue specific database. If no new marketing data is available then the process stops in step 176.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer-implemented method for providing congruent marketing data to a plurality of venue specific clients having different requirements for the data wherein the marketing data is first compiled into a centralized database from a plurality of disparate sources, comprising:
   creating the centralized database for maintaining the marketing data;
   compiling marketing data from the plurality of disparate data sources into the centralized database wherein the marketing data is compiled into the centralized database on a periodic basis;
   creating a venue specific database for each venue specific client as a subset of data contained within the centralized database by extracting the subset of data from the centralized database based on the requirements for each client wherein the venue specific database is in a format specific to the venue specific client and the subset of data for each venue specific database is different; and
   providing access to the venue specific database through an interface module.

2. The method of claim 1 further comprising:
   validating the marketing data before it is compiled into the centralized database.

3. The method of claim 1 wherein the plurality of disparate data sources comprise internal data sources, external data sources and legacy systems.

4. The method of claim 1 wherein the format for the venue specific data comprises a markup language.

5. The method of claim 1 wherein the interface module is an application programming interface.

6. The method of claim 1 including determining the subset of data contained within the centralized database required for the venue specific database for each venue specific client and extracting each determined subset of data from the centralized database to create each venue specific database.

7. The method of claim 6 including distributing the venue specific database for at least one of the client specific venues to that client specific venue.

8. The method of claim 6 wherein at least one of the client venues uses an application programmers interface to create a venue specific application and uses this venue specific application to access the venue specific database created for that client venue.

9. The method of claim 6 wherein the determined subsets of data for the venue specific databases for at least two of the client specific venues are different.

10. The method of claim 1 including creating each venue specific database each time marketing data is added to the centralized database.

11. The method of claim 1 including determining how frequently data from each of the disparate data sources is to be compiled into the centralized database and compiling data from each of the disparate data sources into the centralized database based on the determination of how frequently the data from each disparate data source is to be compiled into the centralized database.

12. A marketing system for providing venue specific data by integrating a plurality of data sources into a centralized database comprising:
   a centralized marketing database for maintaining a compilation of marketing data wherein the centralized marketing database is created from a plurality of data sources;
   a compilation module for compiling the marketing data into the centralized marketing database wherein the compilation module compiles the marketing data on a periodic basis;
   an extract module for extracting a subset of the marketing data from the centralized marketing database for a plurality of clients for the data where each of the clients has different requirements for the data and wherein the extract a subset of the module extracts marketing data from the centralized marketing database based on the requirements for each client to create a venue specific database for each client where each venue specific database has a different subset of the marketing data specific to the requirements of a particular client of the data; and
   a venue specific database comprising the subset of marketing data.

13. The marketing system of claim 12 further comprising:
   a validation module for validating the marketing data in the centralized database wherein the marketing data is validated when it is compiled into the centralized database.

14. The marketing system of claim 12 including a plurality of clients of the data, each of the clients having different requirements for the data, the extract module extracting a subset of the marketing data from the centralized marketing database based on the requirements for each client to create a venue specific database for each client where each venue specific database has a different subset of the marketing data.

15. The marketing system of claim 12 wherein the compilation module determines how frequently to compile data from each of the plurality of data sources into the centralized marketing database and compiling the data from each of the plurality of data sources into the centralized database based upon those determinations.

* * * * *